United States Patent [19]

Archer

[11] Patent Number: 5,029,205
[45] Date of Patent: Jul. 2, 1991

[54] LIGHTED TELEPHONE

[76] Inventor: David D. Archer, 33 Contant, P.O. Box 11246, St. Thomas, V.I. 00801

[21] Appl. No.: 443,331

[22] Filed: Nov. 30, 1989

[51] Int. Cl.$^5$ .............. H04M 1/00; H04M 1/22; F21V 33/00
[52] U.S. Cl. .............. 379/433; 362/24; 362/802; 362/253
[58] Field of Search .............. 379/433, 110, 396; 362/24, 253, 802, 88

[56] References Cited

U.S. PATENT DOCUMENTS

| | | | |
|---|---|---|---|
| 1,669,628 | 5/1928 | Renaud | 362/24 |
| 1,747,976 | 2/1930 | Hitt | 362/24 |
| 1,762,809 | 6/1930 | Bradford | 362/24 |
| 2,558,437 | 6/1951 | Hronec | 362/24 |
| 2,610,262 | 9/1952 | Cunningham | 362/88 |
| 2,677,043 | 4/1954 | Hawk | 362/88 |
| 2,762,868 | 9/1956 | Wandel | 362/253 |
| 2,777,940 | 1/1957 | Spiro et al. | 362/88 |
| 2,998,509 | 8/1961 | Conradt | 362/802 |
| 3,029,593 | 4/1962 | Gerace | 379/110 |
| 3,118,614 | 1/1964 | Mosca | 362/802 |
| 3,412,213 | 11/1968 | McCay | 379/396 |
| 3,821,539 | 6/1974 | Kleinman | 362/88 |
| 3,874,164 | 4/1975 | Bell | 379/110 |
| 3,943,288 | 3/1976 | Reed et al. | 379/110 |
| 4,354,063 | 10/1982 | Kuka | 379/433 |
| 4,491,692 | 1/1985 | Lee | 362/24 |
| 4,618,917 | 10/1986 | Lee et al. | 362/88 |
| 4,847,818 | 7/1989 | Olsen | 379/110 |

FOREIGN PATENT DOCUMENTS 2415394  8/1979  France .............. 379/433

*Primary Examiner*—Jin F. Ng
*Assistant Examiner*—Jason Chan
*Attorney, Agent, or Firm*—Richard C. Litman

[57] ABSTRACT

A telephone handset that has a light bulb disposed on it has a special switch that allows the light to automatically illuminate upon using the phone. The switch changes from an open position to a closed one upon a change in the orientation of gravity. One embodiment of the switch includes a hollow chamber having two separate contact plates disposed at one end and a freely sliding conductive manner that comes into contact with the contacts upon picking up the phone. A second switch embodiment includes three parallel pins with a central one the pins having a hanging pivoting member that serves to contact one of the other pins upon a change in gravitational orientation. Also included is a removable socket member to facilitate replacement of the bulb.

5 Claims, 1 Drawing Sheet

LIGHTED TELEPHONE

BACKGROUND OF THE INVENTION

1. Field of the Invention

The present relates to lumination devices. More particularly, it relates to a telephone having self illumination ability when it is being used. The light is activated upon being picked up by moving a switch and is deactivated upon hanging up by returning the switch to the off position. The present invention also includes a self switching mechanism that turns on the light upon merely picking up the telephone handset and goes off upon replacing the handset on the hook.

2. Description of the Prior Art

The following patents are felt to be related to the present invention, but do not disclose the applicant's invention, whether singly or in combination.

U.S. Pat. No. 2,777,940 issued to Spiro discloses an illuminating device which can be attached to a telephone handset. The light is battery powered.

U.S. Pat. No. 3,821,539 issued to Kleinman discloses a flashlight in the form of a simulated telephone handset. This invention features a light bulb mounted in the earpiece and a mirror in the mouthpiece. This may also be battery powered.

U.S. Pat. No. 4,354,063 issued to Kuka discloses a telephone handset with a built in magnifying glass and a light bulb to illuminate the area of the lens.

None of the above patents discloses an illuminated telephone having an automatic switch that turns on the light when the handset is raised and turns the light off when the handset is replaced on the hook. The user of the telephone doesn't have to worry about finding the switch in order to turn on the light or worry about forgetting to turn the light off to prevent the batteries from running down. This is particularly advantageous at night when there is no light to see by. If the telephone rings near the bed, a person only has to pick up the handset in order to activate the light. There is no need to orient the handset in order to locate the switch in the dark.

SUMMARY OF THE INVENTION

The present invention comprises placing on a telephone handset, between the two ends, a small light bulb. The light can be for the purpose of reading and writing phone numbers and addresses in the dark or for dialing in the dark. Alternatively, the lighted handset can be used as a conventional flashlight in the dark. The handset has an automatic switch that activates the light upon the picking up of the receiver and deactivates the bulb when the receiver is replaced on the hook. This switch can be a gravity operated sliding or pivoting switch that makes or breaks an electrical connection upon changing positions.

The lighted handset would include a battery compartment to provide power for the light bulb. The switch is internally located on the handset. A simple circuit runs between the battery compartment to the switch to the light bulb and back to the battery section. Additional devices such as an LCD digital clock could be run off the power supplied by the batteries. These additional devices would not be in series with the light bulb switch though.

Accordingly, it is one object of the present invention to provide a telephone handset with a local source of illumination.

It is another object of the present invention to provide a telephone light with an automatic switch to activate the local light source upon usage of the telephone handset.

It is a further object of the present invention to provide a telephone illumination source having a sliding switch that connects and closes the light circuit upon picking up the telephone handset.

It is a yet further object of the present invention to provide a telephone illumination source having a pivoting switch that connects and closes the light bulb circuit upon picking up the telephone handset.

It is still another object of the present invention to provide a telephone with an illuminated handset along with various other small electrical devices, such as a digital clock.

It is a further object of the present invention to provide a telephone handset light with a removeable socket.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 2:
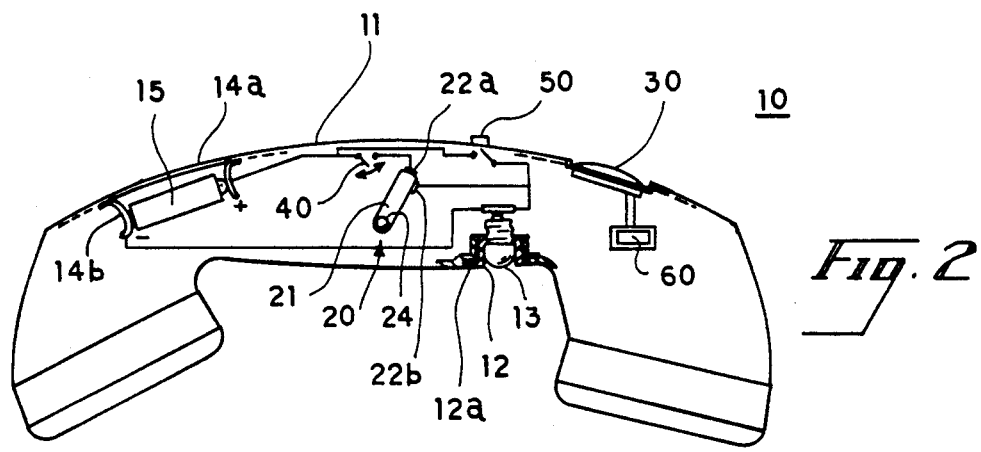
FIG. 2 shows a cross-sectional view of a telephone handset with the localized illumination source and a sliding switch.
Figure 3:
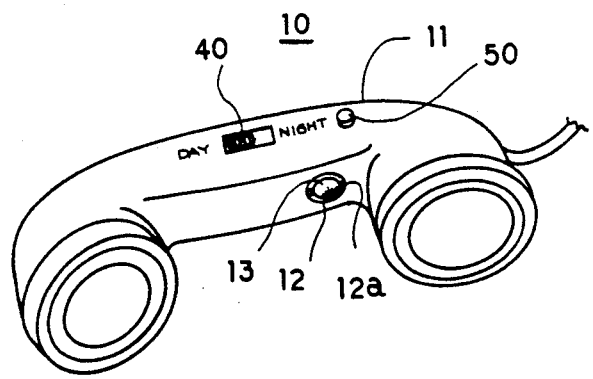
FIG. 3 shows a perspective view of the present invention showing the light in the telephone handset.

The invention of an illuminated telephone handset 10 is shown in one embodiment in FIG. 2. It includes a conventional telephone handset 11 with a threaded removeable light bulb socket 12 disposed in between the ends of the handset. Into this light bulb socket 12 fits a conventional small size light bulb 13, also shown in FIG. 3. The bulb 13 used can be of the type normally used in flashlights. The socket 12 itself is removeable to facilitate replacement of the bulbs 13. Rather than try to grasp the bulb 13, the socket is screwed out by using slots 12a. Towards one end of the handset 11 is a battery compartment 14 that houses one or two small sized batteries 15 of typically the AA size. Covering the compartment 14 is a compartment door 14a that snap fits into place over the compartment 14 and the batteries 15. The power requirements need not produce a blinding illumination as the light 13 is needed only for close use. The battery compartment 14 has the usual spring clip 14b for retaining the batteries 15 in place.

The circuit also includes a switch 20 for making or breaking the circuit between the bulb 13 and the batteries 15. In this case the switch 20 comprises a hollow elongated chamber 21 made of glass or plastic. At one end of the chamber 21 are two metal contacts 22a, 22b spaced apart from one another. Enclosed in the chamber 21 is a metal sphere 24 having a diameter just slightly less than the diameter of the chamber. The chamber 21 is oriented so that when the handset 11 is in the position it would assume upon being hung up, the sphere 24 is at the end of the chamber 21 opposite the contacts 22a, 22b. Upon picking up the handset 11 the chamber 21 assumes an orientation with relation to gravity that allows the sphere 24 to roll toward the other end of the chamber 21. The sphere 24 then comes into contact with the contact plates 22a,22b thus completing the circuit and illuminating the bulb 13. This sphere 24 could be made of solid metal such as steel or silver or could be mercury contained inside a glass chamber 21.

In addition to the gravity switch 20, there are two other switches that are controlled by the user of the telephone 10. A day/night switch 40 is used to disconnect the circuit for the day position and connect the circuit for the night. This allows for preventing the light 13 from being turned on during the day when it is not needed. A third switch 50 is a normally open override light switch that allows the user to turn on the light by pressing the switch 50, even when the day/night switch 40 is in the day position. The day/night switch 40 prevents the battery 15 from being unnecessarily drained during the day when there is plenty of light to see by.

Figure 1:
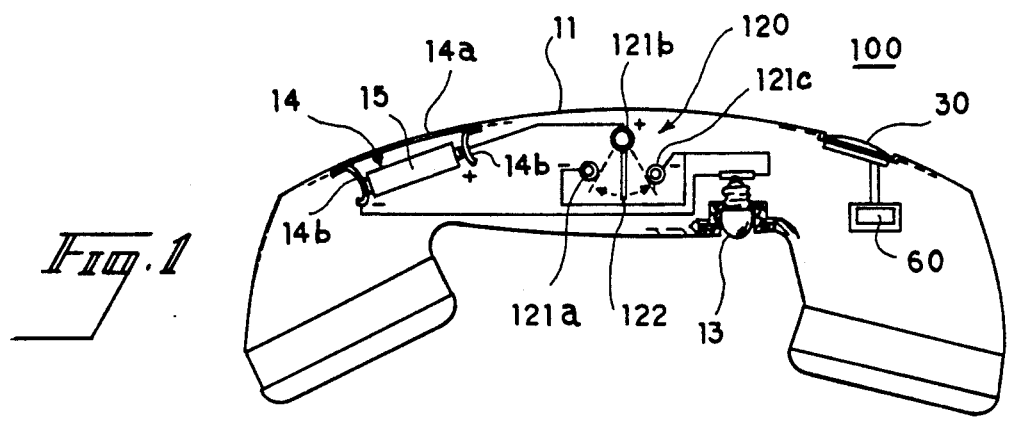
FIG. 1 shows a cross-sectional view of a telephone handset with the localized illumination source and a pivoting switch.

A second embodiment 100 of the present invention is shown in FIG. 1. The basic circuit components are the same as for the previous model shown by FIG. 2. The difference is the use of another type of switch 120. The switch 120 includes three parallel pins 121a, 121b, 121c that serve as contact points. On the center pin 121b is disposed a plate 122 that can pivot about the pin 121b. Again as before, the switch is open when the phone is hung up. The plate 122 hangs down between the pins 121a and 121c. When the handset 11 is picked up the plate rotates to one side or the other and makes contact with one of the pins 121a or 121c to connect the circuit.

Notice that at no time does the user of the phone have to reach for a switch to turn on the light 13 when the day/night switch 40 is in the night position. This is especially helpful in the dark when it isn't clear in what orientation the phone is laying and the person picking up the phone isn't fully awake yet. The user also does not need to worry about turning off the light so that the batteries do not wear out. The handset light is in a sense "idiot proof."

Figure 4:
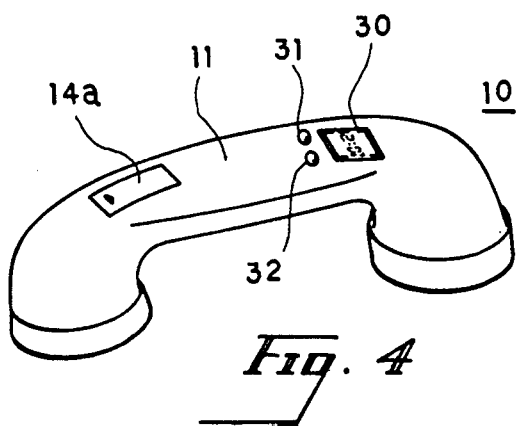
FIG. 4 shows another perspective view of the invention showing the battery compartment and the clock.

Further additions to the handset can include a digital LCD clock 30, shown more closely in FIG. 4. This clock 30 is powered by a separate battery 60, the clock 30 needs constant power to run accurately. The clock includes a timer that can time the number of minutes spent on the phone. Control switches 31, 32 for the clock would control a timer and the time, day and month adjustment.

It is to be understood that the present invention is not limited to the sole embodiment described above, but encompasses any and all embodiments within the scope of the following claims.

I claim:

1. A telephone handset having a local source of illumination comprising:
   a telephone handset having a first end and a second end, wherein said first end is placed to a user's ear and said second end is placed to a user's mouth when said telephone handset is in its normal, active communicating mode;
   an electric socket contained within said telephone handset;
   an electric light bulb contained within said electric socket;
   a battery compartment located inside said telephone handset;
   at least one electric battery contained within said battery compartment;
   a first switch located inside said telephone handset, said first switch having an open position and a closed position, wherein said open position occurs when said telephone handset is placed in a horizontal position, and said closed position occurs when said telephone handset is at an angle to said horizontal position, said angle defined by said first end being elevationally above or below said second end;
   a second switch located inside said telephone handset and placed in series between said at least one battery and said first switch, said second switch having an open position and a closed position,
   wherein said open position of said second switch creates an open circuit between said at least one battery and said first switch, thereby preventing said electric light bulb from illuminating when said telephone handset is at said angle to said horizontal position, and said closed position of said second switch creates a closed circuit between said at least one battery and said first switch,
   positioning means for said second switch located on the exterior of said telephone handset, said positioning means for manually placing said second switch in said open position or said closed position;
   a third switch, normally open and placed in series between said at least one battery and said electric light bulb, and placed in parallel with said first switch and said second switch, said third switch for manually illuminating said electric light bulb regardless of the positions of said first switch or said second switch,
   positioning means for said third switch located on the exterior of said telephone handset, said positioning means for said third switch for manually placing said third switch in an open or closed position;
   telephone electrical circuitry connecting said battery compartment, said first switch, said second switch, said third switch and said electric light bulb, wherein said first switch and said second switch are in series, and said third switch is in parallel with said first switch and said second switch;
   a digital clock located on said telephone handset, said digital clock having a separate power source, and block electrical circuitry isolated from said telephone electrical circuitry;
   whereby said electric light bulb will illuminate when, said second switch is placed in said closed position, said telephone handset is placed at said angle to said horizontal position, wherein said first end is elevationally above or below said second end, thereby causing said first switch to be in said closed position.

2. The telephone handset having a local source of illumination according to claim 1, wherein said first switch further comprises:
   a hollow chamber having opposite ends;
   one of said opposite ends containing two conductive contact plates;
   a conductive element located in said hollow chamber capable of moving freely from one end of said hollow chamber to the other, upon a change in gravitational orientation relative to said hollow chamber and capable of contacting both of said contact plates.

3. The telephone handset having a local source of illumination according to claim 2, wherein said conductive element is a small metallic sphere.

4. The telephone handset having a local source of illumination according to claim 2, wherein said conductive element is a drop of mercury.

5. The telephone handset having a local source of illumination according to claim 1, wherein said first switch comprises:
   three parallel pins orientated in a triangular relationship, with a top in and two base pins;
   a contact plate pivotally hinged to said top pin,
   whereby, when said telephone handset is at said angle to said horizontal position, said contact plate will contact one of said base pins, thereby completing an electrical circuit.

* * * * *